United States Patent
Garbarino (10) Patent No.: US 9,333,890 B2
(45) Date of Patent: May 10, 2016

(54) REPLACEABLE CAR MAT HOLDER

(71) Applicant: Silver Plume, LLC, State College, PA (US)

(72) Inventor: Gwendolyn Mary Garbarino, State College, PA (US)

(73) Assignee: Silver Plume, LLC, State College, PA (US)

( * ) Notice: Subject to any disclaimer, the term of this patent is extended or adjusted under 35 U.S.C. 154(b) by 36 days.

(21) Appl. No.: 14/171,824

(22) Filed: Feb. 4, 2014

(65) Prior Publication Data

US 2015/0217666 A1    Aug. 6, 2015

(51) Int. Cl.
*A47L 23/22* (2006.01)
*B60N 3/04* (2006.01)

(52) U.S. Cl.
CPC ......... *B60N 3/046* (2013.01); *Y10T 428/24008* (2015.01); *Y10T 428/24017* (2015.01)

(58) Field of Classification Search
CPC ..................... Y10T 428/24231; A47L 23/266; A47G 27/0206; B60N 3/044; B60N 3/048
USPC ........................................... 428/99, 124, 126
See application file for complete search history.

(56) References Cited

U.S. PATENT DOCUMENTS

| | | | |
|---|---|---|---|
| 3,238,554 A * | 3/1966 | Mann, Jr. ............. | A47L 23/266 15/217 |
| 4,201,817 A * | 5/1980 | Duncan, Jr. .......... | A47L 23/266 150/154 |
| 4,285,075 A | 8/1981 | Nelson | |
| 4,435,451 A | 3/1984 | Neubert | |
| 4,564,546 A | 1/1986 | Jones | |
| 4,609,580 A | 9/1986 | Rockett et al. | |
| 4,876,135 A | 10/1989 | McIntosh | |
| 5,018,235 A | 5/1991 | Stamation et al. | |
| 5,683,780 A | 11/1997 | Rodger et al. | |
| 5,725,926 A | 3/1998 | Wang | |
| 5,914,169 A | 6/1999 | Brunetto | |
| 6,027,781 A | 2/2000 | Landry et al. | |
| 6,224,962 B1 | 5/2001 | Young, III | |
| 6,295,658 B1 | 10/2001 | Jenkins | |
| 7,024,721 B2 | 4/2006 | McKay | |
| 7,416,771 B2 | 8/2008 | Bailey et al. | |
| 2004/0261208 A1 | 12/2004 | McKay | |
| 2004/0261209 A1 | 12/2004 | McKay | |
| 2006/0088689 A1 | 4/2006 | Lemire et al. | |
| 2006/0107480 A1 * | 5/2006 | De Grandi ...................... 15/215 |

FOREIGN PATENT DOCUMENTS

EP    0 379 630 A1    8/1980

* cited by examiner

*Primary Examiner* — Alexander Thomas
(74) *Attorney, Agent, or Firm* — D. Peter Hochberg; Sean F. Mellino (57) ABSTRACT

A holder for a replaceable mat used in a vehicle having a base and at least one flap with a free edge that secures the replaceable mat. The flap may be integral to the base and may also be flexible to improve the efficiency of loading the replaceable mat. In other embodiments the flap is independent from the base and operatively secured by an attachment device to the base. Other features improve the ease of use and protective capabilities of the holder. The holder also improves safety for use in vehicles and is inexpensive to manufacture. The replaceable mat is preferably absorbent and freely disposable.

30 Claims, 11 Drawing Sheets

REPLACEABLE CAR MAT HOLDER

BACKGROUND OF THE INVENTION

1. Field of the Invention

The invention relates to the field of protective mats, and in particular holders for replaceable mats that may be used in vehicles.

2. Description of the Prior Art

Protective mats for use in vehicles are well known in the art. These mats are typically designed with features that help protect the floor of the vehicle against contaminants, such as liquids, mud, grease, stones, and similar forms of debris. As such, these known car mats are often made from textile or rubber-based material, or a combination thereof. These car mats may come in different color variations or thicknesses. They may also contain certain features for improving its wear resistance. In some instances these known car mats are specifically designed to fit the interior compartment of a particular vehicle. In other instances, known car mats are generally designed to fit the interior compartment of a multitude of different vehicle platforms. Because these mats may be used for the driver-side compartment of a vehicle, they may also require certain safety features for their use. However, one major disadvantage of these known mats is that they are generally understood to have a relatively permanent duration, and their replacement can come at considerable expense to the automobile owner.

Accordingly, there are also floor mats known in the art that are meant to be disposable, in that, they are replaced and discarded with each use. These replaceable mats are often made of a paper-based material which may be absorbent or impervious to moisture, or may contain a combination of layers thereof. Often these replaceable mats are used by automobile mechanics and service garages to protect the vehicle floor, or permanent floor mat itself, from being contaminated by the e.g., service mechanic. These replaceable mats may also be used by new and used automobile dealerships to protect the vehicle floor from being contaminated by customers who test-drive the vehicles. However, one major disadvantage of these known replaceable mats is that they are often inadequately secured, allowing them to crumple and fold under the feet of the vehicle occupant, thereby limiting their usefulness in protecting the vehicle floor. A further disadvantage of these known replaceable car mats is that they generally do not contain features that help to contain contaminants to the mat, nor do these mats typically contain features that prevent the mat from slipping against the vehicle floor, which limits their safety. Yet a further disadvantage of these known replaceable mats is that they are generally configured in a certain size and shape, such as a rectangle, and are not specifically or generally fit to the interior compartment of a vehicle.

There are several prior art patent publications that attempt to overcome the shortcomings of known car mats by using covers to protect the permanent-type car mat itself. For example, U.S. Pat. No. 5,914,169 (Brunetto, 1999) discloses a protective cover comprising a removable uncut pile fabric that protectively encloses the top-side of the mat, where an elastic strip secures the cover to the underside of the floor mat. At least one clear disadvantage of this type of cover is that it is made of a textile fabric, which limits its usefulness in service garages because it is not freely replaceable due to cost.

Another group of patents discloses protective covers that encase the permanent car mat. For example, U.S. Pat. No. 6,027,781 (Landry et al., 2000) discloses a protective cover comprising a shallow tray secured in a hermetic seal and shaped to completely cover the car mat. In yet another example, U.S. Pat. No. 6,224,962 (Young, III, 2001) discloses a floor mat cover including a top and bottom panel coupled along their outer perimeters to define a pocket for receiving the floor mat. At least one clear disadvantage of the forgoing types of covers is that they are inefficient to use because they require the user to spend considerable time placing the permanent-type mat into the tray or pocket. Moreover, these types of holders do not take advantage of the ability to dispose of the mat, which makes their use impractical for automobile dealerships or automotive service mechanics.

Other patents attempt to solve the shortcomings of the prior art by improving the manner in which disposable car mats are employed. For example, U.S. Pat. No. 4,876,135 (McIntosh, 1989) discloses a floor mat with jacket member that has a throat opening in the edge for receiving a sheet of absorbent material, which can be discarded after it has been soiled. At least one major disadvantage of this approach is that the replaceable mat must be loaded into the edgewise throat of the car mat holder, which is cumbersome and time consuming, and thereby limits its practical use for service garages. Moreover, the protective feature of this invention is limited to the absorbency and water resistant properties of the insert mat itself, since the mat holder does not provide any containment features to capture any excess contaminants.

Replaceable mats and their holders are also known for use in dwellings, office buildings, laboratories, and the like. For example, U.S. Pat. No. 4,564,546 (Jones, 1986) discloses a disposable floor mat holder with hingedly connected side flaps that clamp the disposable mat to the base of the holder. The user must clamp the mat to the base by forcing a lip on the flap under a lip in the base in a tongue-and-groove fashion. Correspondingly, the user must force the flap open from the underside of the flap through a hand hole in the base. In another example, U.S. Pat. No. 5,018,235 (Stamatiou et al., 1991) discloses a holder for a disposable floor mat that comprises a base with integral walls that are so arranged to form a tightly-dimensioned recess that provides a close fit with the disposable mat. In one embodiment of that invention, the disposable mat is held by a lip that is integral with the wall of the holder and which extends above the recess. In order to install the disposable mat into the holder, the user must align the edges of the mat with the holder and then bend the holder toward the base so that the mat can be inserted into the closely dimensioned recess.

These dwelling-type disposable floor-mat holders may contain certain safety features that are useful in buildings, but that are disadvantageous for use in vehicles. For example, dwelling floor-mat holders are typically designed for heavy foot traffic, so the disposable mat must be steadfastly secured to the holder, which makes replacing the mat time-consuming, cumbersome, and thereby impractical for use in certain applications such as service repair garages. Furthermore, the foregoing mats are typically designed with integral and/or closely dimensioned components, which require complex tooling, and are therefore expensive to manufacture. In addition, dwelling floor-mat holders are typically heavier and more rigid, and their inflexibility would thereby limit their ability to easily install them into the compact interior compartment of a vehicle. Moreover, the holders of the above-mentioned references disclose tapers extending outwardly to reduce the risk of tripping, which is a hazard not necessarily envisioned when used in a vehicle, and which may be a disadvantage for containing contaminants to the holder. Another disadvantage of these mats is that the anti-skid structures on the underside of the base may be different for use on the hard floors of a building, compared to the textile-floors in an automobile. Yet another disadvantage of the foregoing type of mat is that they do not offer adequate protection for the interior compartment of a vehicle because they are neither generally, nor specifically, shaped for a vehicle, and therefore do not adequately protect the area. In addition, they do not often offer the same protection features as a car floor mat, such as contaminant containment channels or anti-slip texturing, nor are they designed for the natural resting place of the feet of a driver.

Based on these shortcomings of the prior art, it is clear that there is a long-felt, yet unsatisfied need for a holder of a replaceable mat that provides an easy and efficient means for replacing the mat while adequately securing the mat in place. There is still further a need for a holder of a replaceable mat that comprises features for adequately protecting the floor of a vehicle. In addition, there is a need for a holder of a replaceable mat that comprises features for safe and comfortable use in a vehicle. There is yet a further need for a holder of a replaceable mat that is flexible, such that it can be easily installed in a vehicle, and is yet durable enough for continuous use. Another unsatisfied need is a holder for a replaceable mat that is inexpensive and economical to manufacture.

SUMMARY OF THE PRESENT INVENTION

The various embodiments of the present invention have surprisingly overcome the shortcomings of the prior art. In one preferred embodiment, a holder for a replaceable mat is provided that comprises a base for supporting the mat and at least one integral flap comprising a living hinge, wherein the flap operatively secures the mat to the base.

In a second preferred embodiment, a holder for a replaceable mat is provided that comprises a base for supporting the mat and at least one integral flexible flap that extends from a convergence line formed by the convergence of the base and integral flap.

In a third preferred embodiment, a holder for a replaceable mat is disclosed that comprises a base for supporting the mat, at least one independent flap that operatively secures the mat to the base, and at least one attachment means for operatively attaching the flap to the base.

In view of these generally preferred embodiments, it is therefore a general object of the present invention to provide a holder that improves the ease and efficiency of replacing the mat, which is particularly useful for automotive service garages or car dealerships. In more specific embodiments, the ease and efficiency is further improved by providing a flap that may comprise a free edge and/or flexibility; or a pair of such flaps disposed on opposite sides of the holder.

It is another general object of the holder of present invention to provide certain features that protect the floor, or the floor mat of a vehicle. In more specific embodiments, the protection is further improved by providing a base that may comprise impervious materials, containment channels, and/or peripheral lip. Protection may further be improved by providing a flap and/or attachment means that may comprise grating, grooves, and/or tapers.

It is yet another general object of the holder of the present invention to provide safety features and comfort when driving a vehicle. In more specific embodiments, the safety is further improved by providing a base that may comprise anti-slip and/or anti-skid features. The comfort may be improved by providing a base that may comprise compliant material and/or a heel pad for the natural resting place of the feet.

It is yet another general object of the holder of the present invention that it provides features that makes it easy to install into the compact interior compartment of a vehicle. In more specific embodiments, the ease of installation is further improved by providing a base that may comprise flexible materials; a flap that may comprise flexible materials and/or a gap; and/or attachment means that may provide for a gap.

It is another general object of the present invention to provide a holder that is durable and inexpensive to manufacture. In more specific embodiments, the durability is further improved by providing a base and/or flap that may comprise rigid materials; and/or a flap that may comprise integral features. The cost of manufacturing is reduced by providing a holder that may comprise modular, independent components for certain low-volume applications; or may provide integral components that limit SKUs in high-volume applications.

Although the holder as discussed herein is often referred to as a car mat holder, it is not restricted to cars, but could apply to trucks and any other land, air, or marine vehicles or vessels.

These and other objects are achieved by the invention described hereinafter and from the appended claims.

BRIEF DESCRIPTION OF THE DRAWINGS

The invention may take physical form in certain parts and arrangement of parts, the preferred embodiment of which will be described in detail in the specification and illustrated in the accompanying drawings which form a part hereof, and wherein.

DETAILED DESCRIPTION OF THE PRESENT INVENTION

Figure 1:
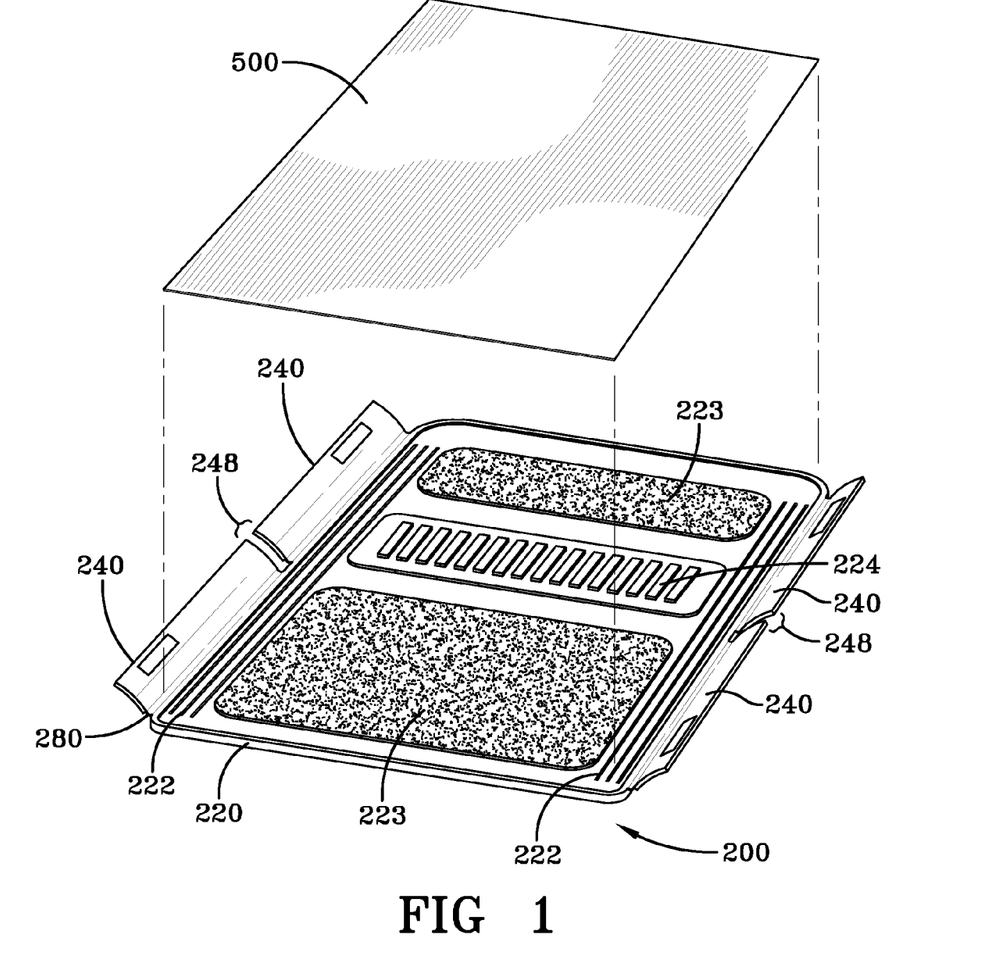
FIG. 1 is a perspective front view of a first preferred embodiment of the holder of the present invention showing loading of the mat.

A first preferred embodiment of the holder of the present invention is shown in FIG. 1. In this first preferred embodiment, a replaceable car mat holder 200 comprises a base 220 for supporting a replaceable mat 500, and at least one integral flap 240 that operatively secures the mat to the base 220. In this embodiment, the integral flap 240 is connected to a living hinge 280 with the base 220, such that the flap 240 is integral with one side of the living hinge 280 and the base 220 is integral with the other side of the living hinge 280.

The base 220 of the holder 200 is generally provided for supporting the replaceable mat 500 and providing protection to the underlying floor. The term floor includes a permanent mat on the floor, or other floor covering on which the replaceable car mat holder may be placed. Since the holder 200 may be used in environments in which the floor must be protected from liquid contaminants, the base 220 of the holder may be made of an impervious material that prevents the liquids from transferring through the base to the floor.

In certain circumstances, the holder 200 may need to be installed in compact locations, such as the interior compartment of a vehicle. In those situations, the base 220 may comprise a flexible material that will enable the holder to be folded in order to aid installation into those compact locations, as well as to lie flat against even an undulating or otherwise uneven floor. The comfort of the holder may also be important to the user, and the base 220 may comprise a compliant material for providing comfortable use. Therefore, it is generally understood that the base of the invention may be made of rubber-based or artificial rubber materials, such as NBR, SBR, or EPDM; thermoplastic materials, such as PVC; or any other material that provides the required characteristics of flexibility, imperviousness, and/or comfort. However, it is also understood that where durability of the holder is important, the base may comprise rigid materials, such as metals, thermosets, thermoplastics, or any other material that provides the necessary durability. It is also understood that the base may be made of any combination of the forgoing flexible or rigid materials.

The color of the base may also be important for practical considerations, such as alerting the user that no mat is installed, by providing visual contrast between the replaceable mat 500 and the base 220. For instance, where the replaceable mat is made of a white material, the base may be black, red, blue, gray, or any color that provides sufficient contrast, or possibly iridescent under low light conditions. In some instances, the base of the invention may be a substantially clear material.

Figure 2A:
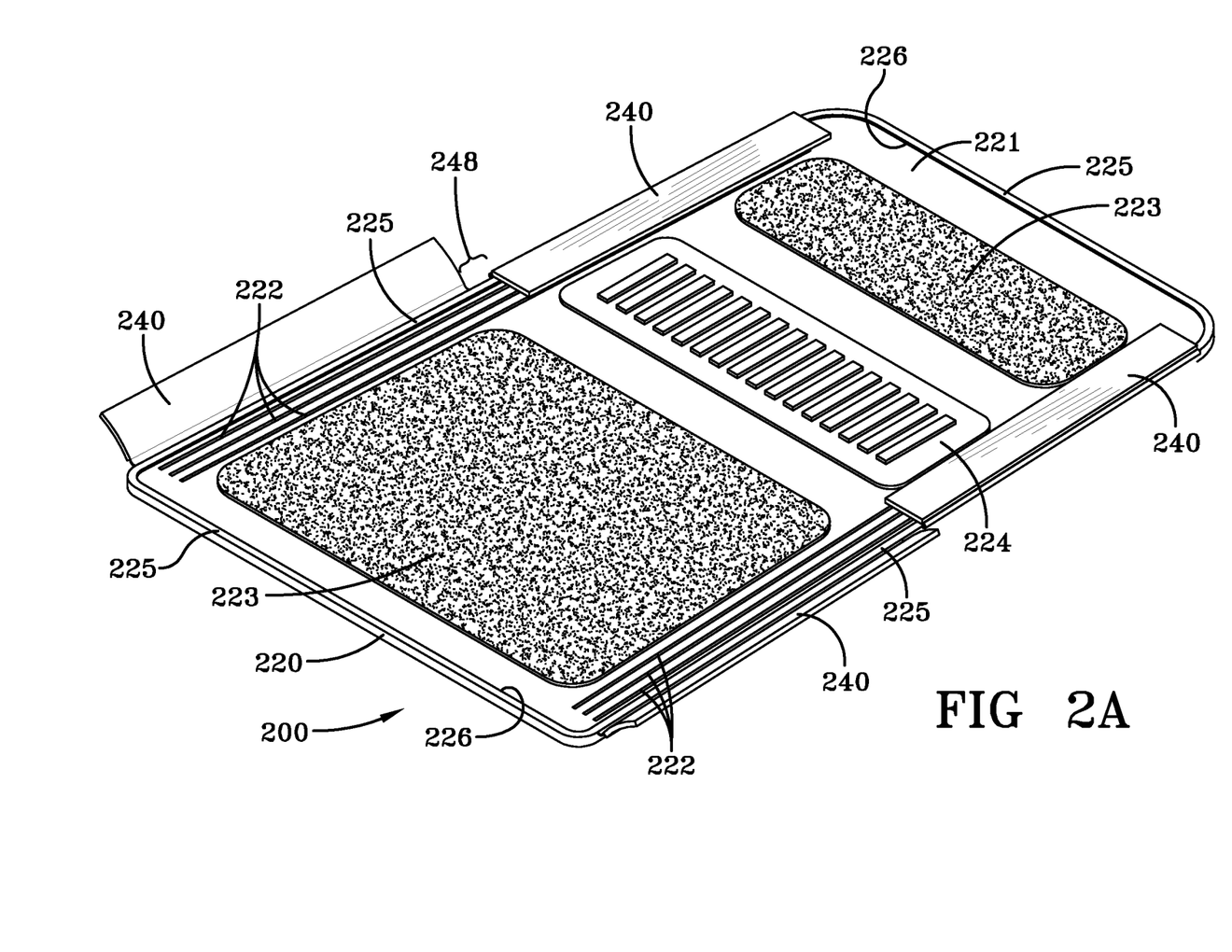
FIG. 2A is a perspective top view of the holder of FIG. 1 showing features of the top-surface of the base according to a preferred embodiment of the invention.
Figure 2B:
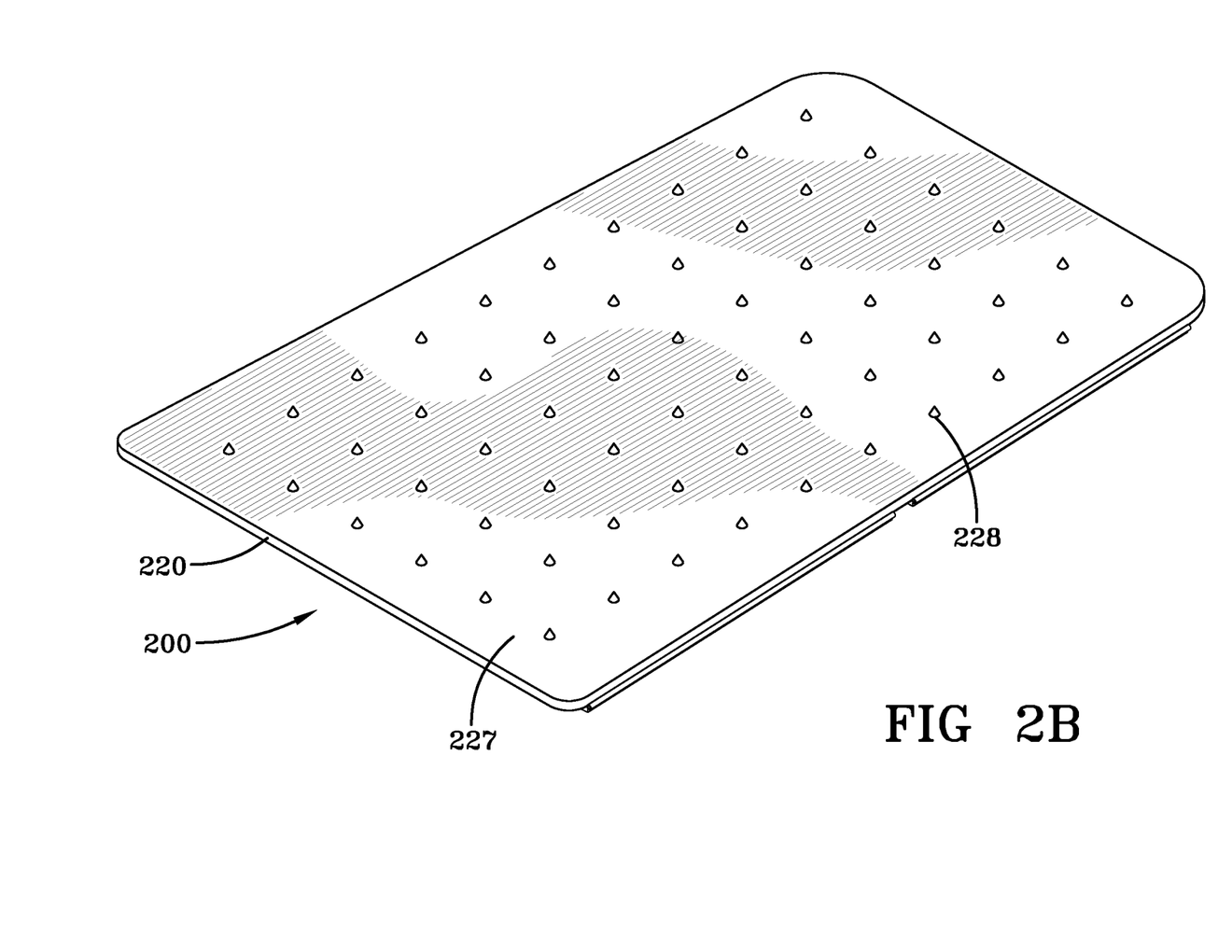
FIG. 2B is a perspective bottom view of the holder of FIG. 1 showing features of the bottom-surface of the base according to a preferred embodiment of the invention.

Turning to FIGS. 2A and 2B, the base 220 of the holder is shown comprising two surfaces, each surface of which may comprise certain features that are important to the present invention. FIG. 2A shows a top-surface 221 of the base 220, which is the surface nearest to the replaceable mat 500. To assist in protecting the floor, the top-surface 221 may have channels 222, which may be in the form of depressions molded into the base 220, and that enable contaminants to be contained to the holder 200. The channels 222 may be disposed proximate to a periphery 225 of the base, or may be disposed in any location where contaminant containment is important.

The top-surface 221 of the base 220 may also comprise certain safety features that are advantageous for use in a vehicle. For example, FIG. 2A shows that the top-surface 221 may also comprise an anti-slip texturing 223, which may be in the form of small protrusions and/or depressions in the base 220. The anti-slip texture 223 improves safety by preventing slip between the replaceable mat 500 and top-surface 221 of the base, which is particularly important while driving. The anti-slip texturing 223 may be provided near the interior of the base where the feet are likely to be placed, or it may be provided in any location where slip of the mat is likely to occur.

The top-surface 221 may further comprise certain features for comfort and improving durability, such as a heel pad 224. The heel pad 224 may be placed where the heel of the user naturally rests when the user is driving a vehicle. The heel pad 224 may further comprise anti-slip and contaminant containment features.

FIG. 2A also shows the periphery 225 of the base 220, which is generally understood to form the shape of the base. In order to improve the protective function of the holder 200, the periphery 225 may take the general shape of the interior compartment of a vehicle, such that the base covers a substantial part of the floor where the feet are placed. In certain circumstances it may be beneficial for the periphery 225 of the base to be customized to the interior compartment of a specific platform of vehicle. It is also understood that providing the proper shape for use in a vehicle can improve safety by preventing shift of the mat or bunching of the mat under the pedals.

FIG. 2A also shows that the periphery 225 of the base may provide a raised edge that extends upwards from the base to form a lip 226. The lip 226 may extend continuously or in discrete intervals around the periphery 225, and is generally provided for improving the protective containment capability of the holder.

Turning now to FIG. 2B, a bottom surface 227 of the base 220 is shown, which is the surface nearest to the floor. To improve the safety of the holder, the bottom surface 227 may comprise an anti-skid texture 228, which may take the form of protrusions that are shaped like spikes. As shown in FIG. 2B, a plurality of anti-skid spikes 228 may be disposed on the bottom surface 227 of the base. The anti-skid spikes 228 prevent the base 220 of the holder from skidding along the floor, and are particularly important for use on the driver side of the vehicle.

Figure 3:
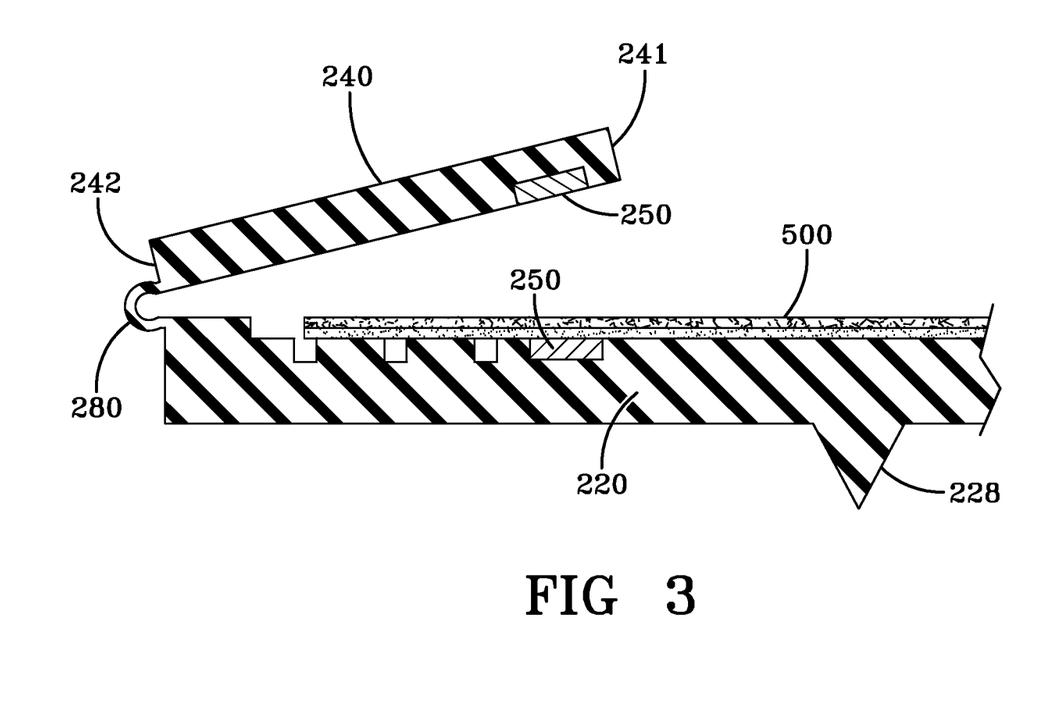
FIG. 3 is a cross-sectional side view showing the flap area of the holder of FIG. 1 according to a preferred embodiment of the present invention.

Turning now to FIG. 3, a flap 240 that operatively secures the replaceable mat 500 to the base 220 is shown. In the first preferred embodiment of the present invention, the flap 240 is an integral flap in that it is integrally connected to a living hinge 280, which is also integrally connected to the base 220. A living hinge is generally known as a thin flexible hinge that may be made from the same material as the two pieces that it connects, and allows the two pieces to bend along the axis of the hinge. The integral flap 240 of the first embodiment may be particularly advantageous where the holder 200 is used in heavy duty applications, such as vehicle cargo areas or rental cars, where the replaceable mat may be used for some duration and the durability of the holder is important. The integral flap 240 may also provide manufacturing advantages by limiting the number of stock keeping units (SKUs) that may otherwise be required by a more modular design.

The holder 200 of the present invention is surprisingly easy and efficient to use when replacing the mat. One important feature that improves the ease and efficiency of using the holder of the present invention is that the integral flap 240 may comprise a free edge 241 that extends along the length of the flap 240 and is opposite an integrally attached edge portion 242. The free edge 241 allows the person replacing the mat 500 to use their fingers to easily engage the free edge 241 and use finger pressure to pull the flap 240 upwards, away from the base 220, so that the peripheral edge of the replaceable mat 500 can efficiently be placed in the area between the flap 240 and base 220.

Yet another feature of the present invention that improves the ease and efficiency of replacing the mat is that the flap may be made of a flexible material. The flexibility of the flap allows the user to easily bend the flap on any axis along the length of the flap for efficiently replacing the mat. This is particularly important for those embodiments of the present invention that do not contain a hinge and utilize a flexible flap to expose the area for placement of the mat. In the first preferred embodiment, the flap 240 is integral with the living hinge 280 and therefore the base 220; thus the flap 240 may preferably be made of the same material as the base 220 and living hinge 280, or a compatible material that may be formed therewith.

While it is understood that the flap of the present invention may be made of a flexible material in certain preferred embodiments, where extra durability is required, the flap may also be made of a rigid material, such as a thermoset, thermoplastic, composite, or any combination of rigid materials. It is also understood that the flap may also comprise both a flexible portion and a rigid portion.

An important object of the flap of the invention is to provide a means for operatively securing the replaceable mat to the base. A secure means 250 of the flap may comprise a fastener, such as a snap, latch, clasp, strap, or hook-and-loop (i.e., Velcro®). As shown in FIG. 3, the secure means 250 may comprise magnets located in the flap 240 and base 220. The secure means may also be provided by the internal spring force of the flexible flap, which exerts a force on the replaceable mat 500 as the flap is bent away from the base due to the installed mat and attempts to recover to its unbent state. Further yet, the secure means may be provided by frictionally holding the replaceable mat, such as when the mat 500 is wedged under the flap. The secure means of the invention may be any means that operatively secures the mat to the base, or any combination of means thereof.

The flap of the invention should have sufficient dimensions to adequately secure the mat to the base. As shown in FIG. 1, an embodiment of the flap 240 may be rectangular in shape. The flap may extend along the length of the base 220 of the holder. The width of the flap 240 when used on a holder for use in automobiles may preferably be between 12 mm and 250 mm, more preferably between 19 mm and 175 mm, and even more preferably between 25 and 75 mm.

Figure 4A:
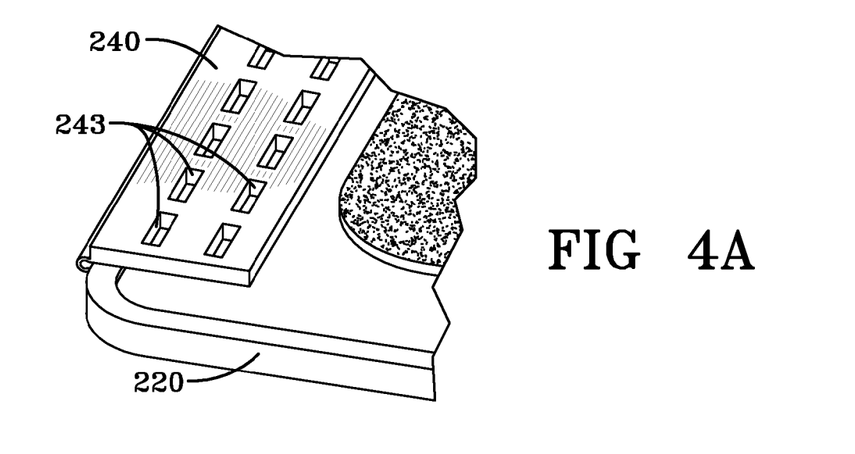
FIG. 4A is a partial perspective view of the flap area of FIG. 1 showing grating according to a preferred embodiment of the invention.

The flap of the present invention may also provide certain advantageous features for protecting the floor underlying the holder. Turning to FIG. 4A, the flap 240 is shown as being a grating with openings 243 extending therethrough. The openings 243 in the flaps enable contaminants to pass through the flap 240 to the underlying replaceable mat 500, or the holder 200, where the contaminants may be contained. The openings 243 may be in any pattern that enables contaminants to pass through, such as a square, diamond, or honeycomb pattern. The pattern of openings 243 may even be a series of perforations in either a continuous or irregular pattern. The size of the openings 243 should be sufficiently large to allow contaminants, such as liquid or debris, to pass through. As such, the size of the openings 243 may preferably be between 0.5 mm and 25 mm, more preferably between 1 mm and 12 mm, and even more preferably between 1.5 mm and 6 mm.

Figure 4B:
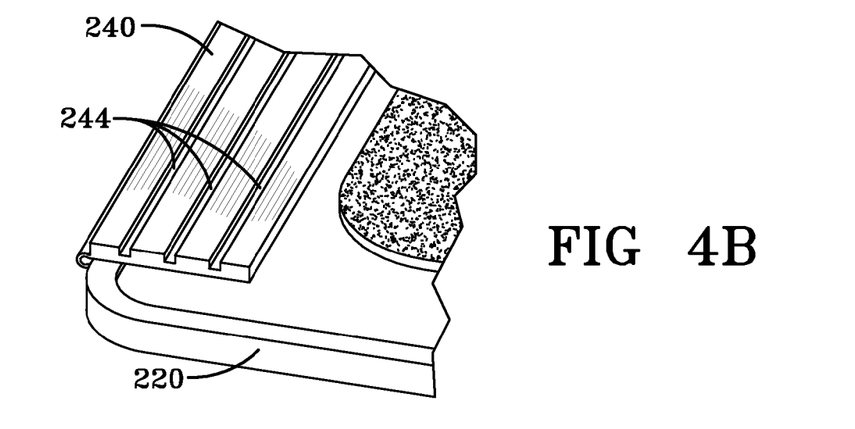
FIG. 4B is a partial perspective view of the flap area of FIG. 1 showing grooves according to a preferred embodiment of the invention.
Figure 4C:
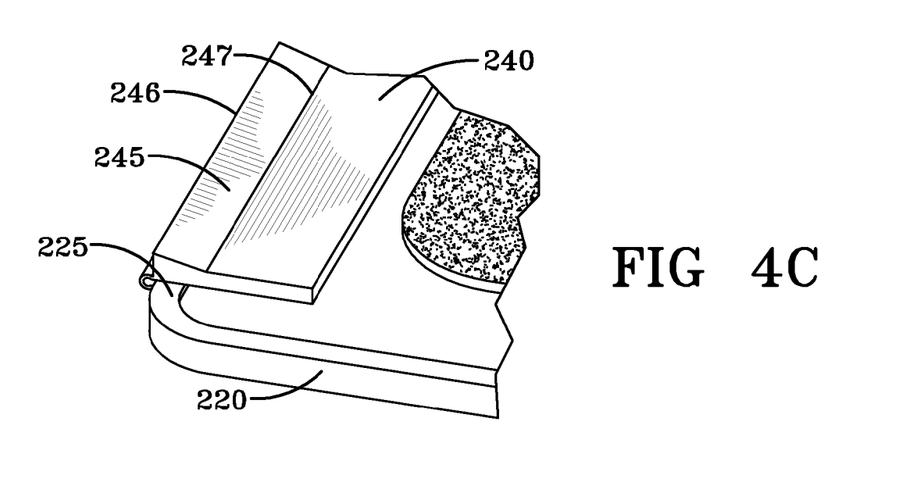
FIG. 4C is a partial perspective view of the flap area of FIG. 1 showing a taper according to a preferred embodiment of the invention.

Yet another feature that provides additional protection of the floor is that the flap 240 may comprise a groove or grooves 244 that help contain contaminants, as depicted in FIG. 4B. Further yet, the flap 240 may comprise a tapered outer component or structure 245 that is configured to contain the contaminants. As shown in FIG. 4C, the tapered structure 245 comprises an inclined surface extending between a higher portion 246 and a lower portion 247, such that the higher portion 246 is distal the interior portion of the base top surface 221 and the lower portion 247 is proximal the interior portion of the base top surface 221.

The flap of the present invention may be a single flap that operatively secures the replaceable mat to the base; or the flap may be a plurality of flaps. The flap(s) may extend around the periphery of the base continuously or in discrete intervals. In a surprising discovery, it was found that the ease and efficiency of replacing the mat was improved when a pair of flaps were disposed on opposite sides of the holder. This configuration was found to still adequately secure the mat to the base. The pair of opposite flaps may further be substantially parallel to each other along the length of the holder.

Figure 9:
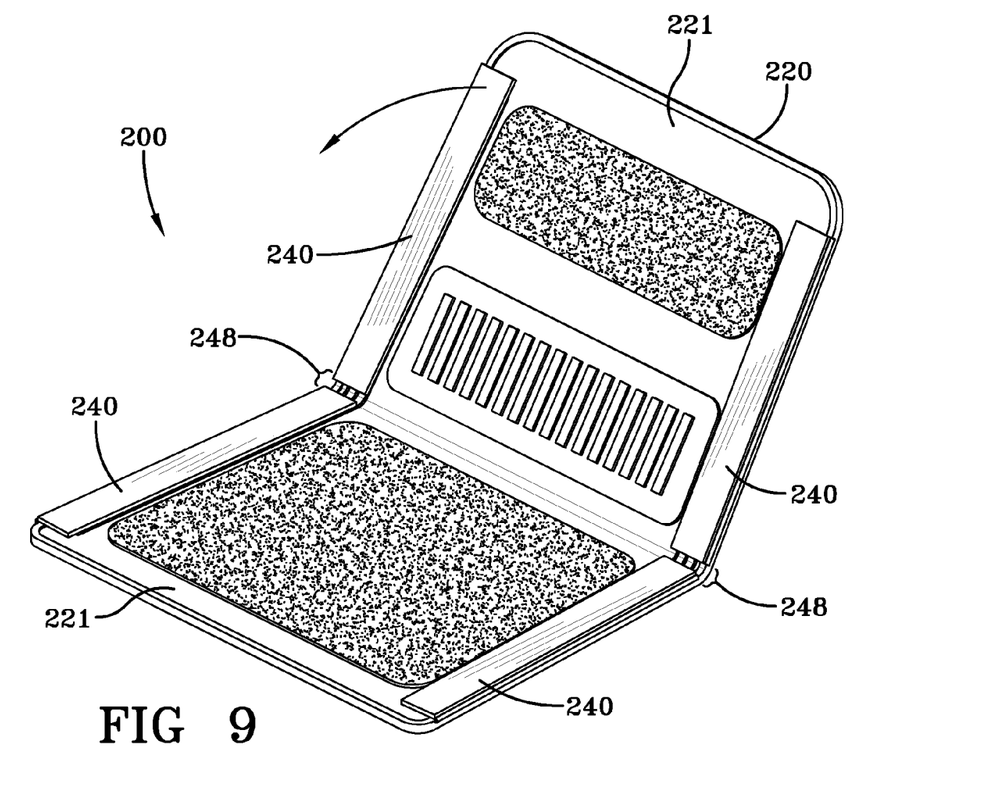
FIG. 9 is a perspective front view of the holder of FIG. 1 showing a bi-fold of the holder.
Figure 10:
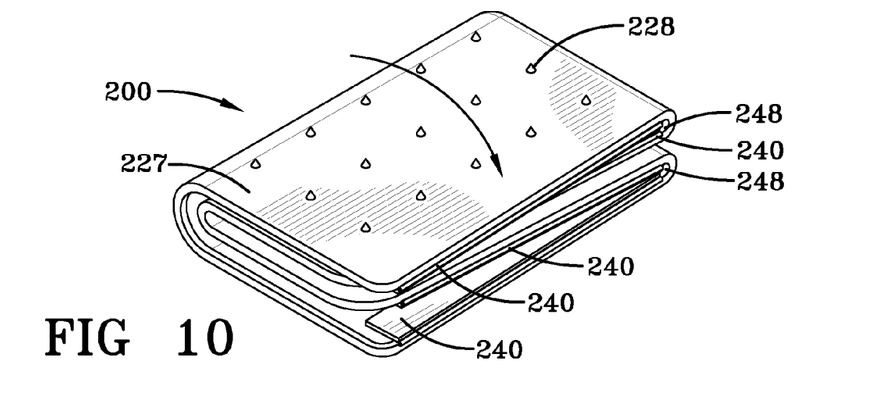
FIG. 10 is a perspective front view of the holder of FIG. 1 showing a quad-fold of the holder.

Another advantageous feature of the holder of the present invention is that it may provide sufficient flexibility so that it can be folded for installing the holder into compact locations, such as the interior compartment of a vehicle, or may provide for efficient storage of the holder. One way in which the present invention may provide for a foldable holder is by providing a gap 248 between adjacent flap 240 members, as shown in FIG. 1. In the first embodiment, the gap 248 is said to interrupt the integral flap 240 by substantially extending from the free edge 241 of the flap to the integrally attached edge portion 242. As shown in FIGS. 9 and 10, the gap 248 enables the base 220 of the holder to be folded at the gap 248 or along the line created between two opposed gaps. The gap of the invention may be of particular importance where the flap is made of a more rigid material than the base material. The gap between adjacent flaps may preferably be between 2 mm and 200 mm, more preferably between 6 mm and 150 mm, and even more preferably between 12 mm and 100 mm.

Figure 5:
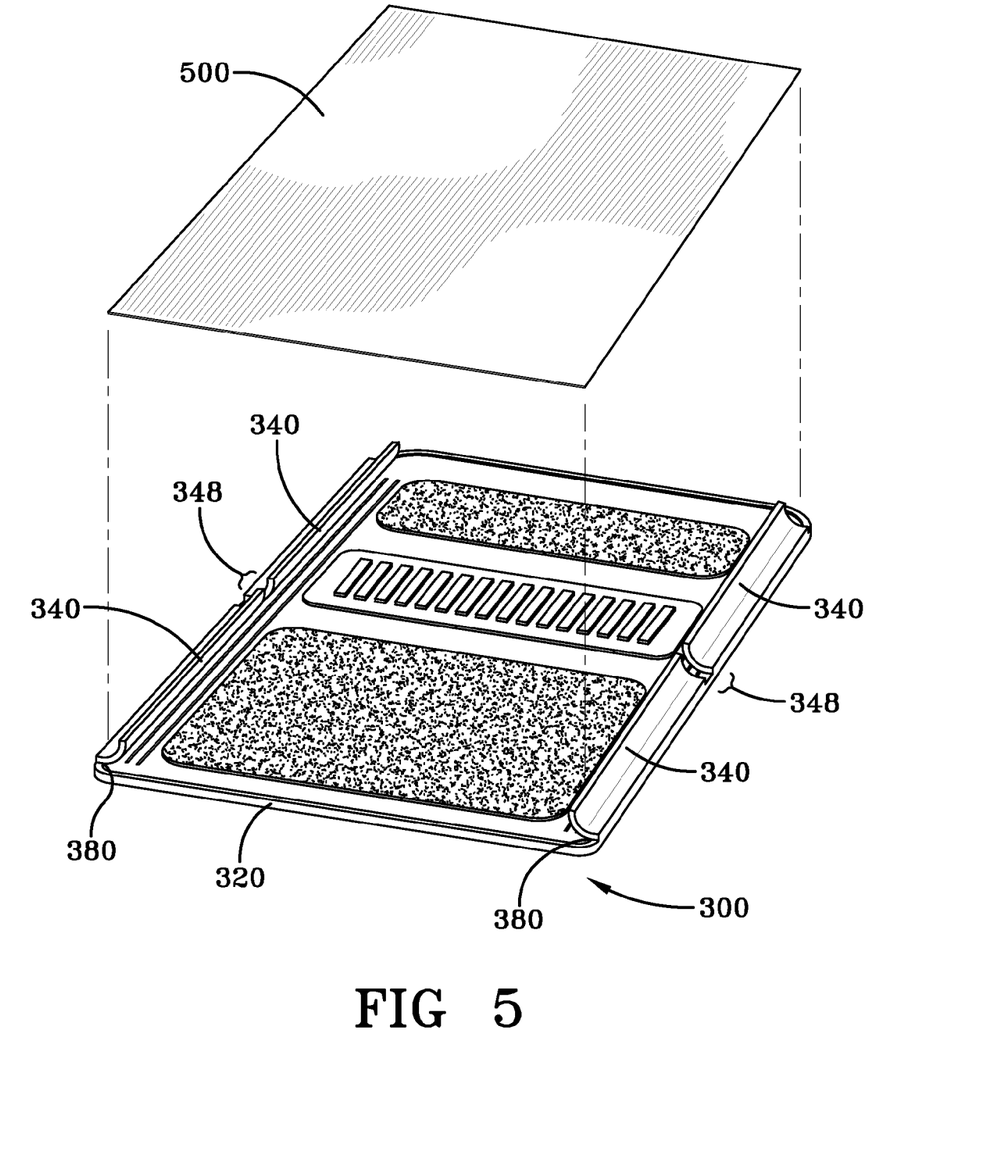
FIG. 5 is a perspective front view of a second preferred embodiment of the holder of the present invention showing loading of the mat.

Turning now to FIG. 5, a second preferred embodiment of the present invention shows a replaceable car mat holder 300 for a replaceable mat 500 comprising a base 320 for supporting the mat and at least one integral flap 340 that extends from a convergence line or joint 380 formed by the convergence of the integral flap 340 with the base 320. In this second embodiment, shown in cross-section in FIG. 6A, the integral flap 340 is integral in that it is formed with a part of the base 320 and overlaps a part of the base with a flap 340 that is generally parallel and adjacent to the base 320 in the holder's unloaded configuration.

As mentioned with reference to the features of the first embodiment, the integral flap 340 may provide advantages of improving durability and limiting manufacturing SKUs. Moreover, since the integral flap 340 is not hingedly attached to the base, this second preferred embodiment further improves the durability of the holder by eliminating a possible weak point of the hinge. Accordingly, it is generally understood that without a hinge, the integral flap 340 should comprise sufficient flexibility to enable replacement of the mat 500 by bending the flap 340 away from the base 320 along any bending axis of the flap. As discussed above, a flexible flap has demonstrated an improvement in the efficiency of replacing the mat, while still adequately securing the mat.

Figure 6A:
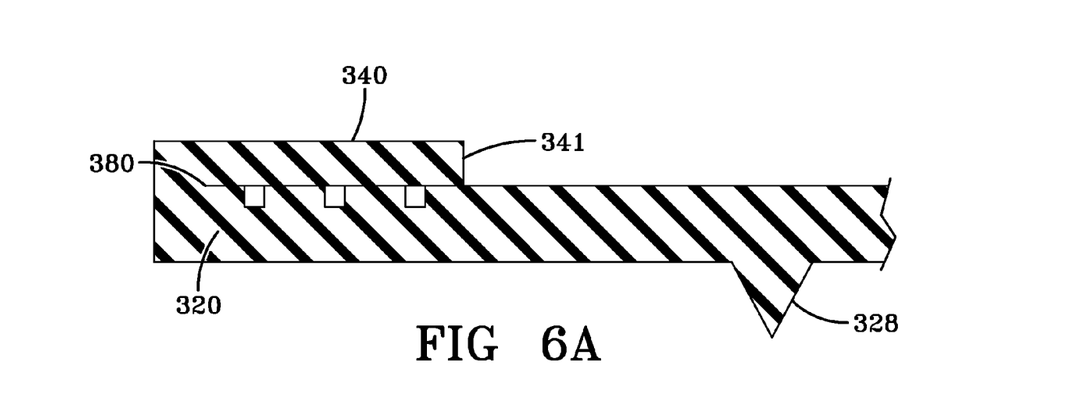
FIG. 6A is a cross-sectional side view according to a preferred embodiment of the invention showing the flap area of FIG. 5 in an unloaded configuration.
Figure 6B:
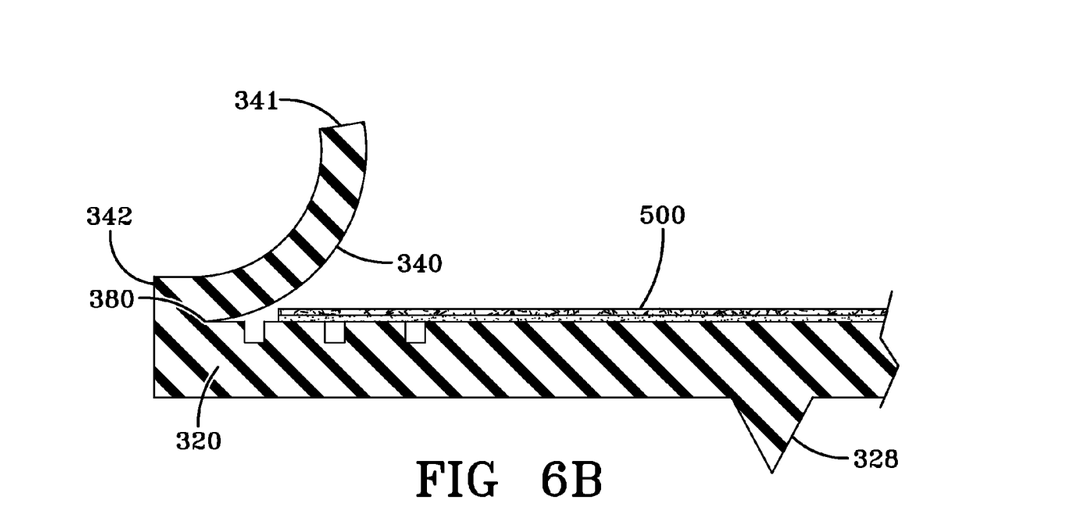
FIG. 6B is a cross-sectional side view showing the flap area of FIG. 5 in a partially loaded configuration according to a preferred embodiment of the invention.

As shown in FIGS. 6A-6B, the integral flap 340 comprises a free edge 341 that extends along the length of the flap and is opposite an integrally attached edge portion 342. As previously mentioned with the integral flap 240 of the first preferred embodiment, the free edge 341 of the present invention is surprisingly advantageous for improving the ease and efficiency of replacing the mat 500, while still adequately securing the mat. This is because the free edge 341 enables the user to use their fingers to easily engage the flap 340 and use finger pressure to pull the flap upwards, away from the base 320, to install the mat 500.

As would be understood by a person having ordinary skill in the art, the holder 300 of the second embodiment may comprise any of the above-mentioned protection, safety, efficiency, manufacturability, or installation features that were described with respect to the first embodiment above. For example, the base 320 of the second embodiment, shown in FIG. 5, may comprise channels, anti-slip texture, heel pad, anti-skid texture, peripheral shape, and/or peripheral lip similar to the forgoing first embodiment. The base 320 may also comprise an impervious, compliant, flexible, durable, colored, and/or clear material. Likewise, the integral flap 340 of the second embodiment may comprise secure means, free edge, grating, grooves, and/or tapered structure similar to the forgoing first embodiment. Since the flap extends from the base in the second embodiment, the flap 340 may be made of the same material as the base 320, or a compatible material that may be formed therewith.

The integral flap 340 of the second embodiment may be a single flap, or a plurality of flaps disposed around the periphery of the base or on opposite sides of the holder. As shown in FIG. 5, the integral flap 340 may provide for a gap 348 that assists folding of the holder, wherein the gap 348 is said to interrupt the integral flap 340 by substantially extending from the free edge 341 of the flap to the integrally attached edge portion 342. The integral flap 340 may be so dimensioned to sufficiently secure the mat base, as those dimensions were described with respect to the first embodiment above.

Figure 7:
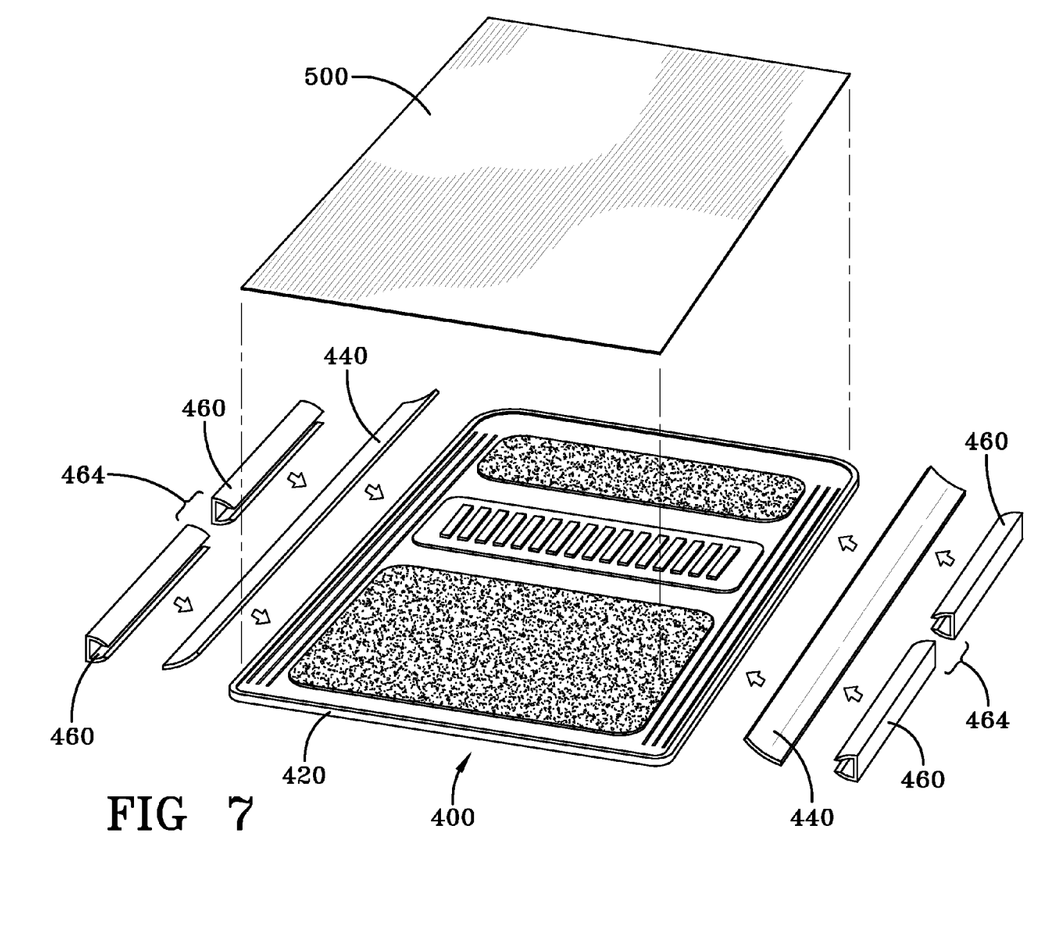
FIG. 7 is a perspective exploded front view of a third preferred embodiment of the holder of the present invention showing loading of the mat.

Turning now to FIG. 7, a third preferred embodiment of the present invention shows a replaceable car mat holder 400 for a replaceable mat 500 comprising a base 420, at least one independent flap 440, and at least one attachment device 460 for operatively attaching the flap to the base 420. In this embodiment, the flap 440 is an independent flap, in that, it is formed separate from the base 420 and is operatively attached thereto by an attachment device 460.

The independent flap 440 of the third preferred embodiment advantageously provides the ability to use a different material than the base 420. For example, the material for the independent flap 440 may provide unique functional properties that the base 420 material could not practically, or economically, achieve. The independent flap 440 also advantageously provides the ability to replace the flap 440 when damaged or when it needs to be cleaned. Moreover, the modular design of the third preferred embodiment may provide for inexpensive manufacturing of the holder, since each component may be separately purchased from vendors and assembled as required, thereby limiting the need for expensive tooling.

As with the foregoing first and second preferred embodiments, a feature that may improve the ease and efficiency of replacing the mat 500 is that the flap 440 may be made of a flexible material. The flexibility of the flap 440 allows the user to easily bend the flap on any axis along the length of the flap for efficiently replacing the mat, which is particularly important for those embodiments that do not contain a hinge. Accordingly, it is understood that a flexible flap of the invention may be made of PP, LDPE, HDPE, PVC, or any other flexible material. However, where extra durability is required, the flap of the invention may also be made of a rigid material, such as a thermoset, thermoplastic, composite, or any combination of rigid and flexible materials.

Figure 8A:
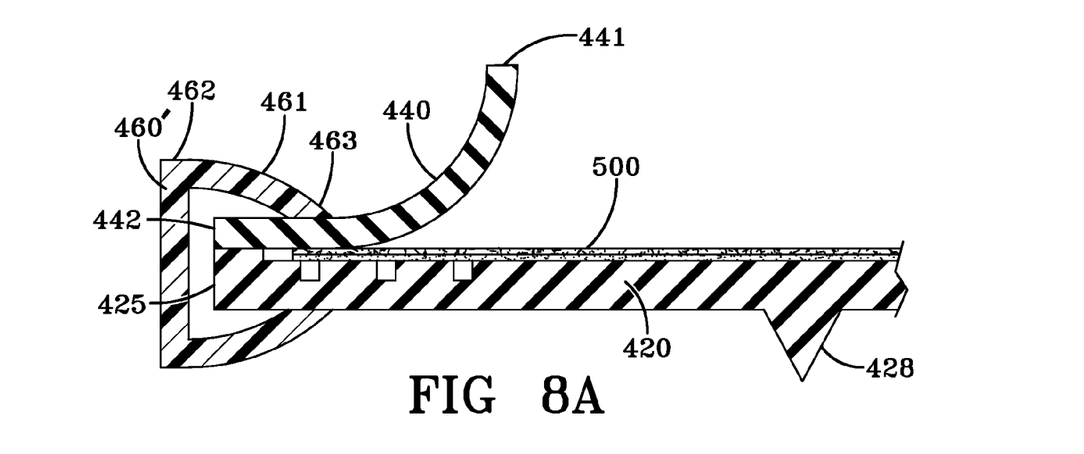
FIG. 8A is a cross-sectional side view of the flap area of FIG. 7 showing a fastener attachment means with a clip according to a preferred embodiment of the invention.
Figure 8B:
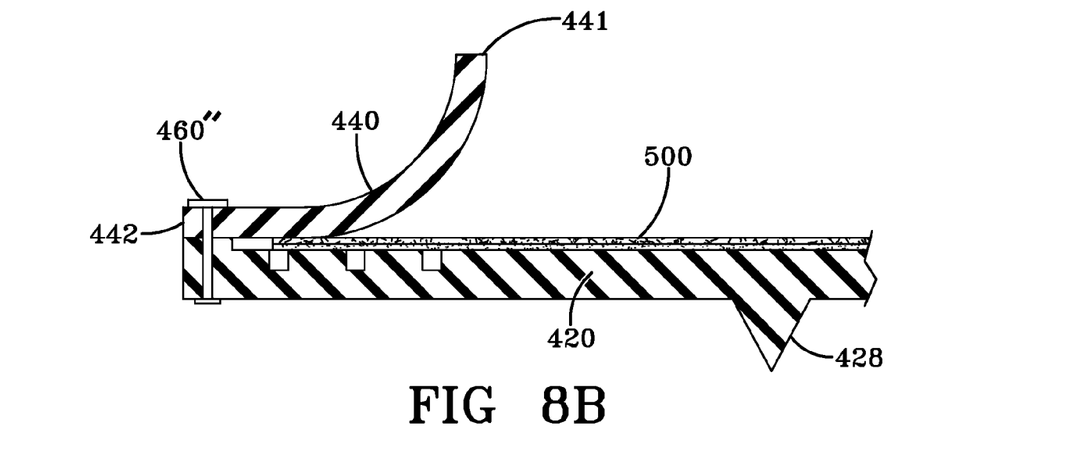
FIG. 8B is a cross-sectional side view of the flap area of FIG. 7 showing a fastener attachment means with a rivet according to a preferred embodiment of the invention.
Figure 8C:
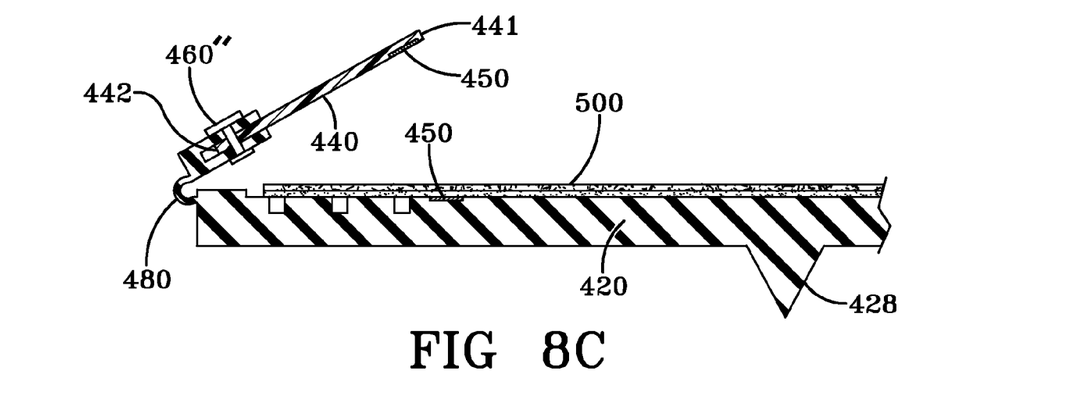
FIG. 8C is a cross-sectional side view of the flap area of FIG. 7 showing a fastener attachment means with a rivet and flap further comprising a hinge according to a preferred embodiment of the invention.

As shown in FIGS. 8A-8C, the independent flap 440 of the third embodiment comprises a free edge 441 that extends along the length of the flap and is opposite an attached edge portion 442. As previously mentioned with respect to the foregoing flaps of the first and second preferred embodiments, the free edge 441 of the flap 440 in the third preferred embodiment provides for a holder 400 that is surprisingly easy and efficient to use when replacing and securing the mat 500.

As would be understood by a person having ordinary skill in the art, the holder 400 of the third preferred embodiment may comprise any of the above-mentioned protection, safety, efficiency, manufacturability, or installation features that were described with respect to the first and second preferred embodiments above. For example, the base 420 of the third embodiment, shown in FIG. 7, may comprise channels, anti-slip texture, heel pad, anti-skid texture, peripheral shape, and/or peripheral lip similar to the forgoing first and second embodiments. The base 420 may also comprise an impervious, compliant, flexible, durable, rigid, colored, and/or clear material. Likewise, the independent flap 440 of the third embodiment may comprise secure means, grating, grooves, and/or tapered structure similar to the forgoing first and second embodiments.

The independent flap 440 of the third embodiment may be a single flap, or a plurality of flaps disposed around the periphery of the base or on opposite sides of the holder. The independent flap 440 may provide for a gap (not shown) that assists folding of the holder, wherein the gap is defined by the distance between adjacent flap 440 members. The independent flap 440 may be so dimensioned as to sufficiently secure the mat base, as those dimensions were described with respect to the first embodiment above.

Turning now to FIGS. 8A-8C, various attachment devices 460 of the third embodiment of the present invention are shown. The attachment device 460 operatively attaches the independent flap 440 to the base 420 of the holder. The attachment device of the present invention may be any component by which the independent flap 440 is operatively attached to the base 420, either directly or indirectly, such as by fastener, adhesive, magnet, and/or any combination thereof.

Where the attachment device 460 comprises a fastener, it may be a clip, clasp, clamp, rivet, stud, snap, hook-and-loop, screw, bolt, nail, pin, latch, flange, zipper, stitch, staple, or and/or strap. FIG. 8A shows the attachment device 460' as a clip fastener, and FIG. 8B shows the attachment device 460" as a rivet fastener. The fastener attachment device may be made of any durable material, such as metal, inorganic, polymer, composite, or any combination thereof. The fastener may be independent, such that it can be freely removed from the holder, or it may be an integral part of the holder 400, such as an integral part of the base 420. Where the attachment device 460 is a fastener, it is generally understood that the independent flap 440 does not operate with a hinging action on a single axis. Instead, the independent flap 440 attached by fastener should comprise sufficiently flexibility to enable replacing the mat 500 by bending the flap 440 away from the base along any bending axis of the flap. As mentioned previously, this flexibility has unexpectedly resulted in improving the ease and efficiency of replacing the mat.

The attachment device 460 of the present invention may also provide certain advantageous features for protecting the floor underlying the holder. For example, FIG. 8A shows a clip attachment device 460' that comprises a tapered structure 461 that is configured to contain contaminants to the holder 400 or mat 500. The attachment device tapered structure 461 comprises an inclined surface extending between a higher portion 462 and a lower portion 463, such that the higher portion 462 is distal the interior portion of the base top surface (not shown) and the lower portion 463 is proximal the interior portion of the base top surface (not shown).

The attachment device 460 may also comprise other protection features, such as grooves and/or grating, and may incorporate those features as they were previously described for the flap of the present invention.

The attachment device 460 of the present invention may be a single attachment device that operatively attaches the independent flap 440 to the base 420; or the attachment device 460 may be a plurality of attachment devices. The attachment device 460 may extend along the length of the independent flap 440 in a continuous manner, or the plurality of attachment devices 460 may extend along the length of the independent flap 440 in discrete intervals. In many circumstances it is preferable that the attachment device 460 attaches to, or engages, the independent flap 440 proximate to the periphery 425 of the base 420.

Where the attachment device 460 is made of a rigid material and is sufficiently long enough to inhibit folding of the holder, it may be advantageous for adjacent attachment devices to be disposed such that a gap 464 is formed between them, as shown in FIG. 7. As previously mentioned, the ability to fold the holder enables ease of installation into compact locations, or provides for efficient storage of the holder. The gap 464 between adjacent attachment devices 460 is preferably between 2 mm and 200 mm, more preferably between 6 mm and 150 mm, and even more preferably between 12 mm and 100 mm.

Turning to FIG. 8C, the independent flap 440 is shown to further comprise a hinge 480. The hinge 480 may be particularly advantageous where the independent flap 440 is made of a rigid material, and wherein replacing the mat 500 is accomplished by hinging the flap 440 upward, away from the base 420, and placing the peripheral edge of the mat in the area between the flap 440 and the base 420.

The hinge 480 may be independently attached to the base 420, and may be a butt, flush, concealed, continuous, living, or piano hinge. The hinge 480 may be made of a durable material, such as metal, polymer, inorganic, composite, or any combination thereof. As shown in FIG. 8C, hinge 480 may otherwise be integral to the base 420 as a living hinge, wherein the hinge 480 will typically be made of the same material as the base, or a compatible material formed therewith.

Figure 11:
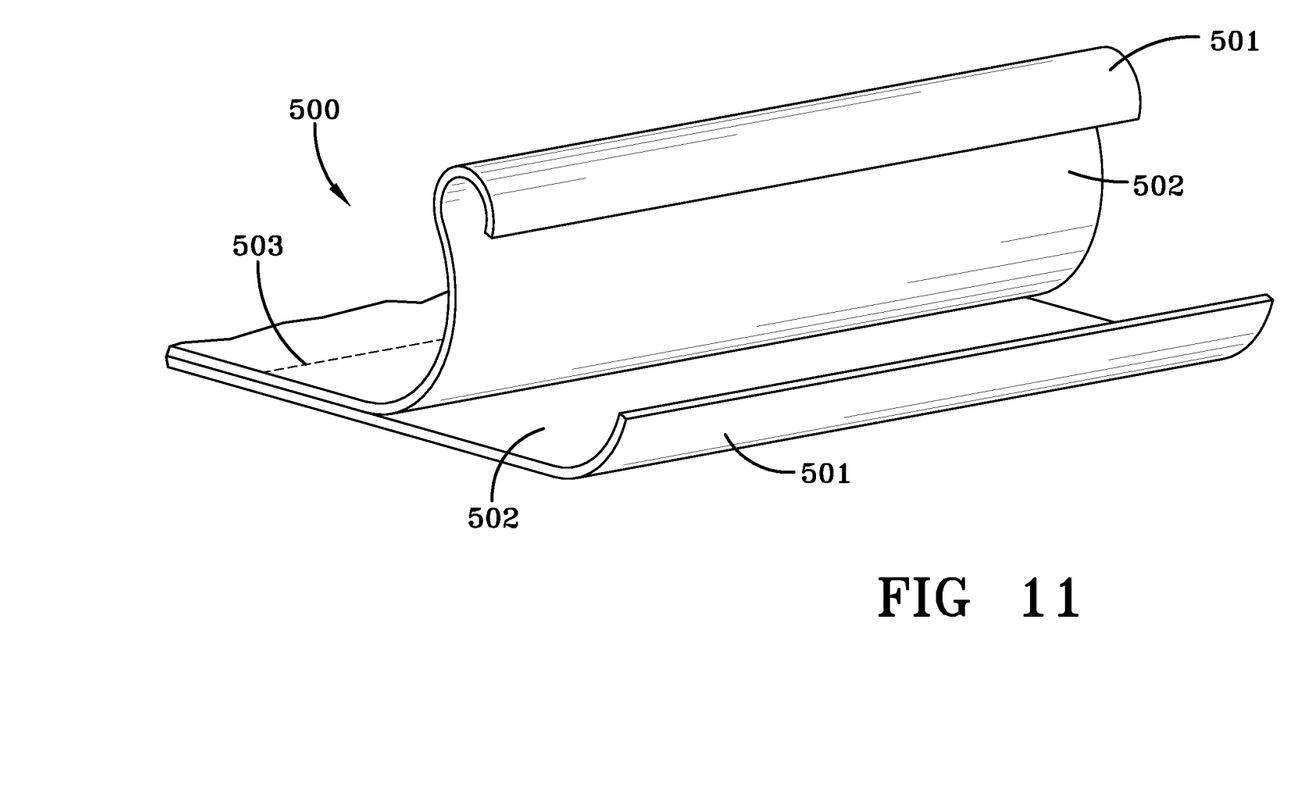
FIG. 11 is a perspective front view of a replaceable mat of the present invention.

While the object of the embodiments in the present invention are generally drawn to the holder for a replaceable mat, it is also understood that a replaceable mat may also form a part of the present invention, and can be used with any of the embodiments described above. Turning to FIG. 11, a replaceable mat 500 is shown. The replaceable mat 500 may comprise any absorbent material that helps to capture contaminants, such as a highly-fibrous material and/or a high-absorbency microfiber material. The absorbent mat 500 may also comprise an impervious layer or layers, such as polypropylene, paper, and/or thin corrugated paper, which functions to prevent contaminants, particularly liquid contaminants from escaping through the mat. The replaceable mat 500 may be a multi-layer mat that comprises an absorbent 501 and impervious 502 layer. As shown in FIG. 11, the replaceable mat 500 may be a double-backed mat such that it comprises two double layer mats that are joined at a seam 503. It is generally understood that the replaceable mat 500 is made of an inexpensive material such that it is freely disposable after each use, but the mat may also be made of more durable materials, such as a linen, canvas, or heavy-duty cotton/polyester fabrics. The replaceable mat 500 may also comprise a plurality of replaceable mats that are placed in the holder of the present invention.

As discussed, the holder of the present invention has provided surprising and unexpected improvements over the prior art by providing a mat that is easy and efficient to use, offers myriad protection and safety features, and is also inexpensive to manufacture. The invention has been described in detail with particular reference to its preferred embodiments, but variations and modifications may occur to those skilled in the art from the foregoing description and from the following claims. For example, while the present invention is generally directed toward use in the interior compartment of a vehicle, it may also be used in other areas of a vehicle such as the trunk, cargo area, or truck bed lining. It is also envisioned that the presently disclosed invention need not be limited to use in vehicles, but could be used in any fashion where a holder for replaceable mat with the forgoing advantages over the prior art may be required.

I claim:

1. A holder for a replaceable mat, said holder having at least one linear side, said holder comprising:
   a base for supporting the mat;
   at least one integral flap extending along said at least one linear side, and said at least one of said at least one integral flap having at least one gap to divide said at least one integral flap into more than one adjacent integral flaps located along said at least one linear side, said more than one adjacent integral flaps for securing the mat to said base;
   a living hinge integrally connected to said base and to said more than one adjacent integral flaps;
   wherein each of said more than one adjacent integral flaps respectively have a length and comprises a free edge that extends along said length of said respective more than one adjacent integral flaps; and
   wherein each of said more than one adjacent integral flaps is movable between a closing position for operatively securing a replaceable mat to said base, each of said more than one adjacent integral flaps is devoid of structure for interlocking said more than one adjacent integral flaps with said base to fasten the replaceable mat to said base, and an open position for enabling either the placing of a replaceable mat on said base or removing a replaceable mat from said base.

2. The holder of claim 1 wherein each of said more than one adjacent integral flaps are flexible.

3. The holder of claim 1 wherein said more than one adjacent integral flaps each further comprise a grating having openings for allowing contaminants to pass through said openings.

4. The holder of claim 1 wherein each of said more than one adjacent integral flaps include at least one pair of integral flaps, each of said at least one pair of integral flaps being disposed on opposite sides of said holder.

5. The holder of claim 4 wherein said at least one pair of integral flaps are flexible and comprise a grating having openings, and wherein said base is flexible and further comprises a top surface for being adjacent to the mat, a bottom surface for being adjacent to the floor, and a periphery, wherein:

said top surface comprises channels for containing contaminants, anti-slip texture for preventing slip of the mat against said base, and a heel pad;
said bottom surface comprises anti-skid texture for preventing slip of said holder against the floor; and
said periphery comprises a raised edge that forms a lip for containing contaminants to said holder.

6. The holder of claim 1 wherein each of said more than one adjacent integral flaps each comprise a tapered structure, said tapered structure comprising an inclined surface extending between a higher portion of each of said more than one adjacent integral flaps and a lower portion of each of said more than one adjacent integral flaps for containing contaminants to the mat or holder, said higher portion being distal a base top surface interior portion and said lower portion being proximal said base top surface interior portion.

7. The holder of claim 1 wherein said base is flexible.

8. The holder of claim 1 wherein said base further comprises a top surface for being adjacent to the mat, a bottom surface being adjacent to the floor, and a periphery, wherein:
said top surface comprises channels for containing contaminants, and anti-slip texture for preventing slip of the mat against said base; and
said bottom surface comprises anti-skid texture for preventing slip of said holder against the floor; and
said periphery comprises a raised edge that forms a lip for containing contaminants to said holder.

9. A holder for a replaceable mat comprising:
a base for supporting the mat;
at least one integral linear flap that operatively secures the mat to said base;
a living hinge integrally connected to said base and to said at least one linear integral flap;
wherein each of said at least one linear integral flap has a length and comprises a free edge that extends along said length of said respective at least one linear integral flap; and
wherein said at least one integral flap has at least one gap interrupting said length of said at least one integral flap to create adjacent integral flaps extending in a linear direction, and wherein each of said at least one gap substantially extends from said free edge of said linear integral flap to an integrally attached edge of said linear integral flap.

10. A holder for a replaceable mat comprising:
a base for supporting the mat;
at least one integral flap that operatively secures the mat to said base;
a living hinge integrally connected to said base and to said at least one integral flap;
wherein each of said at least one integral flap has a length and comprises a free edge that extends along said length of said respective at least one integral flap; and
wherein said at least one integral flap comprises a tapered structure, said tapered structure comprising an inclined surface extending between a higher portion of said integral flap and a lower portion of said integral flap for containing contaminants to the mat or holder, said higher portion being distal both said living hinge and a base top surface interior portion and said lower portion being closer to said living hinge than said free edge and proximal said base top surface interior portion.

11. A holder for a replaceable mat comprising:
a base for supporting the mat;
a pair of integral flaps disposed on opposite sides of said holder that operatively secure the mat to said base, said pair of integral flaps being flexible and comprising a grating having openings, and said base being flexible and further comprising a top surface adjacent to the mat, a bottom surface adjacent to the floor, and a periphery, wherein:
said top surface comprising channels for containing contaminants, anti-slip texture for preventing slip of the mat against said base, and a heel pad;
said bottom surface comprising anti-skid texture for preventing slip of said holder against the floor; and
said periphery comprising a raised edge that forms a lip for containing contaminants to said holder;
a living hinge integrally connected to said base and to each of said pair of integral flaps;
wherein each of said pair of integral flaps has a length and comprises a free edge that extends along said length of said respective pair of integral flaps.

12. A holder for a replaceable mat comprising:
a base for supporting the mat;
at least one integral flap that operatively secures the mat to said base wherein each of said at least one integral flap comprising a grating having openings for allowing contaminants to pass through said openings;
wherein each of said at least one integral flap has a length and comprises a free edge that extends along said length of said respective at least one integral flap; and
wherein said at least one integral flap is movable between a closing position for operatively securing mat to said base, said at least one integral flap is devoid of structure for interlocking said at least one integral flap with said base to fasten said replaceable mat to said base, and an open position for enabling either the placing of a mat on said base or removing a mat from said base.

13. The holder of claim 12 wherein said at least one integral flap is flexible.

14. The holder of claim 12 wherein said at least one integral flap is a pair of integral flaps disposed on opposite sides of said holder.

15. The holder of claim 12 wherein said at least one integral flap has at least one gap interrupting said length of said at least one integral flap, and wherein each of said at least one gap substantially extends from said free edge of said integral flap to an integrally attached edge of said integral flap.

16. The holder of claim 15 wherein said base is flexible and further comprises a top surface for being adjacent to the mat, a bottom surface for being adjacent to the floor, and a periphery, wherein:
said top surface comprises channels for containing contaminants, anti-slip texture for preventing slip of the mat against said base, and a heel pad;
said bottom surface comprises anti-skid texture for preventing slip of said holder against the floor; and
said periphery comprises a raised edge that forms a lip for containing contaminants to said holder.

17. The holder of claim 12 wherein said at least one integral flap comprises a tapered structure, said tapered structure comprising an inclined surface extending between a higher portion of said integral flap and a lower portion of said integral flap for containing contaminants to the mat or holder, said higher portion being distal a base top surface interior portion and said lower portion being proximal said base top surface interior portion.

18. The holder of claim 12 wherein said base is flexible.

19. The holder of claim 12 wherein said base further comprises a top surface for being adjacent to the mat, a bottom surface for being adjacent to the floor, and a periphery, wherein:

said top surface comprises channels for containing contaminants, and anti-slip texture for preventing slip of the mat against said base; and said bottom surface comprises anti-skid texture for preventing slip of said holder against the floor; and said periphery comprises a raised edge that forms a lip for containing contaminants to said holder.

20. A holder for a replacement mat comprising:
a base for supporting the mat;
at least one integral flap that operatively secures the mat to said base; and
a living hinge integrally connected to said base and to said at least one integral flap;
wherein each of said at least one integral flap has a length and comprises a free edge that extends along said length of said respective at least one integral flap;
wherein said at least one integral flap is movable between a closing position for operatively securing the mat to said base, said at least one integral flap is devoid of structure for interlocking said at least one integral flap with said base to fasten said replaceable mat to said base, and an open position for enabling either the placing of a mat on said base or removing a mat from said base; and
wherein said at least one integral flap further comprises a grating having openings for allowing contaminants to pass through said openings.

21. The holder of claim 20 wherein each of said at least one integral flap is a pair of integral flaps, each of said pairs of integral flaps being disposed on opposite sides of said holder.

22. The holder of claim 20 wherein each of said at least one integral flap comprises a tapered structure, said tapered structure comprising an inclined surface extending between a higher portion of each of said at least one integral flap and a lower portion of each of said at least one integral flap for containing contaminants to the mat or holder, said higher portion being distal a base top surface interior portion and said lower portion being proximal said base top surface interior portion.

23. The holder of claim 20 wherein said base is flexible.

24. The holder of claim 20 wherein said base further comprises a top surface for being adjacent to the mat, a bottom surface for being adjacent to the floor, and a periphery, wherein:
said top surface comprises channels for containing contaminants, and anti-slip texture for preventing slip of the mat against said base; and
said bottom surface comprises anti-skid texture for preventing slip of said holder against the floor; and
said periphery comprises a raised edge that forms a lip for containing contaminants to said holder.

25. A holder for a replaceable mat according to claim 20, wherein said at least one integral flap comprises a pair of integral flaps disposed on opposite sides of said holder for operatively securing the mat to said base, wherein said pair of integral flaps are flexible and comprise a grating having openings, and wherein said base is flexible and further comprises a top surface being adjacent to the mat, a bottom surface being adjacent to the floor, and a periphery, wherein:
said top surface comprises channels for containing contaminants, anti-slip texture for preventing slip of the mat against said base, and a heel pad;
said bottom surface comprises anti-skid texture for preventing slip of said holder against the floor; and
said periphery comprises a raised edge that forms a lip for containing contaminants to said holder.

26. A holder for a replaceable mat comprising:
a base for supporting the mat;
a pair of integral flaps disposed on opposite sides of said holder for operatively securing the mat to said base wherein said pair of integral flaps are flexible and comprise a grating having openings, and wherein said base is flexible and further comprises a top surface for being adjacent to the mat, a bottom surface for being adjacent to the floor, and a periphery, wherein:
said top surface comprises channels for containing contaminants, anti-slip texture for preventing slip of the mat against said base, and a heel pad;
said bottom surface comprises anti-skid texture for preventing slip of said holder against the floor; and
said periphery comprises a raised edge that forms a lip for containing contaminants to said holder;
a living hinge integrally connected to said base and to said at least one integral flap;
wherein each of said at least one integral flap has a length and comprises a free edge that extends along said length of said respective at least one integral flap; and
wherein said at least one integral flap is movable between a closing position for operatively securing mat to said base, said at least one integral flap is devoid of structure for interlocking said at least one integral flap with said base to fasten said replaceable mat to said base, and an open position for enabling either the placing of a mat on said base or removing a mat from said base.

27. The holder of claim 26 wherein each of said at least one integral flap is flexible.

28. A holder for a replacement mat according to claim 26, wherein said at least one integral flap further comprises a grating having openings for allowing contaminants to pass through said openings.

29. The holder of claim 26 wherein each of said at least one integral flap is a pair of integral flaps, each of said pairs of integral flaps being disposed on opposite sides of said holder.

30. The holder of claim 26 wherein each of said at least one integral flap comprises a tapered structure, said tapered structure comprising an inclined surface extending between a higher portion of each of said at least one integral flap and a lower portion of each of said at least one integral flap for containing contaminants to the mat or holder, said higher portion being distal a base top surface interior portion and said lower portion being proximal said base top surface interior portion.

* * * * *